(12) United States Patent
Mondal et al.

(10) Patent No.: US 8,904,211 B2
(45) Date of Patent: Dec. 2, 2014

(54) FREQUENCY REDUCTION OF MOBILE DEVICE CORES BASED ON APPLICATION PROCESSING REQUIREMENTS

(75) Inventors: Shyama Prasad Mondal, San Diego, CA (US); Kavitha Vallari Devara, La Jolla, CA (US); Ashfaque Mansur, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 229 days.

(21) Appl. No.: 13/457,979

(22) Filed: Apr. 27, 2012

(65) Prior Publication Data

US 2013/0290751 A1 Oct. 31, 2013

(51) Int. Cl.
*G06F 1/26* (2006.01)

(52) U.S. Cl.
CPC .................................. *G06F 1/26* (2013.01)
USPC ............................. 713/320; 713/322

(58) Field of Classification Search
USPC .................................. 713/320, 322
See application file for complete search history.

(56) References Cited

U.S. PATENT DOCUMENTS

| | | | |
|---|---|---|---|
| 8,095,816 B1* | 1/2012 | Chan et al. | 713/324 |
| 2004/0244011 A1* | 12/2004 | Morris et al. | 719/318 |
| 2005/0076253 A1* | 4/2005 | Lu | 713/320 |
| 2006/0282692 A1* | 12/2006 | Oh | 713/300 |
| 2012/0221873 A1* | 8/2012 | Wells et al. | 713/322 |

* cited by examiner

*Primary Examiner* — Dennis M Butler
*Assistant Examiner* — Alyaa T Mazyad
(74) *Attorney, Agent, or Firm* — Neugeboren O'Dowd PC

(57) ABSTRACT

This disclosure describes systems, methods, and apparatus for reducing power consumption of an application processor in a user equipment. State information of applications that indicate an expected load requirement that the applications will likely place on the application processor, can be used to control power management features of the application processor. For instance, an operating frequency of the application processor, or online cores of the application processor, can be reduced. The number of online cores (those that are not idled) can also be changed to tailor performance and power consumption to the load requirement. Other power management techniques such as adjusting core operational voltage can also be implemented.

19 Claims, 6 Drawing Sheets

FREQUENCY REDUCTION OF MOBILE DEVICE CORES BASED ON APPLICATION PROCESSING REQUIREMENTS

BACKGROUND

1. Field

The present disclosed embodiments relate generally to wireless mobile computing devices, and more specifically to power conservation in such devices via varying an operating frequency or online state of one or more cores of an application processor.

2. Background

Mobile communication devices including devices such as smartphones, tablet computers, gaming devices, and laptop computers are now ubiquitous. A common and ongoing issue with these types of devices is power management. Although advances continue to be made in the areas of battery technology and hardware efficiency, current mobile device power management techniques are not adequate to meet user expectations and will almost certainly not be satisfactory in the future.

The application processor (or app processor) in many mobile wireless communication devices (or user equipment (UE)) has a variable operating frequency, which can be lowered to conserve power. App processors are also starting to see multiple cores, thus allowing one or more cores to be idled or put into an offline state to save power. Both of these power saving techniques save power at the expense of processing power, an acceptable tradeoff when the app processor is not being fully utilized anyway. Traditional UE have the ability to tailor the number of online cores and/or tailor the operating frequency to the app processor's utilizing (or load requirement).

For instance, when a user visits a website, the browser typically downloads a root html document from a remote server. In doing so, the browser resolves the domain name server (DNS) and establishes a communication connection with the remote server. This process can take 2.5 to 3 seconds on a 3G network because the modem has to be switched on and brought back up. During this 2.5 to 3 seconds, the browser typically does not perform any processing, but rather waits for a response from the remote server. As a result, the app processor is lightly loaded. Yet, the app processor typically continues to operate at the same frequency, which is higher frequency than necessary to handle this light processing load.

The operating frequency and number of online cores (versus those in idle mode) can be reduced in order to better match power consumption to the app processor load requirement, but current methods of doing so are reactive—they occur in reaction to processor loading. For instance, a core controller (e.g., mpdecision algorithm) typically decides which cores to put into an online or offline state (or idled mode), and a governor (e.g., DCVS) typically controls the operating frequency of each online core (e.g., clock scaling). The core controller and governor monitor a load on the app processor, and in response, modify the number of online/offline cores and operating frequency of online cores to minimize power consumption. The trouble with this scheme is that the core controller and governor react to the app processor load and thus entail some delay before power consumption is reduced to a minimum level needed to meet the app processor load requirement.

FIG. 1 illustrates a block diagram of traditional software, hardware, and firmware components in a mobile wireless computing system 100. The block diagram includes applications 102 (e.g., a web browser) at the highest level of abstraction and hardware such as the applications processor 114 at the lowest level. The kernel 108 along with traditional interface 106 enable communication between the applications 102 and the applications processor 114. In particular, traditional interfaces 106 pass system calls from the applications 102 to the kernel 108. The governor and core controller 112 monitor a load on the app processor 114 and determine a number of cores 116 to operate offline (in idle mode) and an operating frequency to operate the online cores 116 at. For instance, the governor can be an "ondemand," a "conservative," or an interactive governor (for Android UEs), each of which periodically samples the app processor 114 load to determine whether to raise or lower the app processor 114 operating frequency. The governor and core controller 112 can then control the number of operating cores 116 and operating frequency of the cores 116 via the kernel scheduling module 110. As seen, power consumption of the app processor 114 can only be controlled after-the-fact—after a load has already been placed on the app processor 114.

Although the applications 102 (e.g., browser 103) can communicate with the kernel 108 via traditional interfaces (or APIs) 106 in the form of system calls, there is no way to communicate a load requirement of the applications 102 to the kernel 108.

SUMMARY OF THE DISCLOSURE

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

One aspect of the disclosure describes a system for reducing power consumption on a mobile communication device, where the system has an application processor, one or more applications, a scheduling interface, and a kernel or a kernel layer. The application processor can have a plurality of cores, each core operating at one or more operating frequencies. The one or more applications can perform user-initiated and automated tasks and run on at least one or the plurality of cores, and provide state information indicating a predicted load that the one or more applications are expected to place on the application processor. The scheduling interface can run on the application processor, and be configured to facilitate communication of the state information from the one or more applications. Finally, the kernel can run on the application processor and control the one or more operating frequencies. The kernel can also be configured to (1) receive the state information from the one or more applications via the scheduling interface, and (2) decrease the one or more operating frequencies of the plurality of cores to new operating frequencies that are cumulatively high enough to meet the predicted load, thereby reducing power consumed by the application.

Another aspect of the disclosure describes a method of operating a user equipment so as to conserve power via use of knowledge of application state information. The method includes operating an application processor of a user equipment, where the application processor comprises one or more cores. Each of the one or more cores operates at one or more operating frequencies. The method further includes monitoring state information of one or more applications performing tasks and running on at least one of plurality of cores, where the state information represents a predicted load that the one or more applications are expected to place on the application processor. Lastly, the method includes adjusting a number of the one or more cores that are operating in an idle state in order to meet the predicted load indicated by the state information.

Another aspect of the disclosure is a non-transitory, tangible computer readable storage medium, encoded with processor readable instruction to perform a method for conserving power in a user equipment by using knowledge of application state information to manage power usage of an application processor. The method includes operating an application processor of a user equipment, where the application processor comprises one or more cores. Each of the one or more cores operates at one or more operating frequencies. The method further includes monitoring state information of one or more applications performing tasks and running on at least one of plurality of cores, where the state information represents a predicted load that the one or more applications are expected to place on the application processor. Lastly, the method includes adjusting a number of the one or more cores that are operating in an idle state in order to meet the predicted load indicated by the state information.

BRIEF DESCRIPTION OF THE DRAWINGS

Various objects and advantages and a more complete understanding of the present invention are apparent and more readily appreciated by referring to the following detailed description and to the appended claims when taken in conjunction with the accompanying drawings:

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
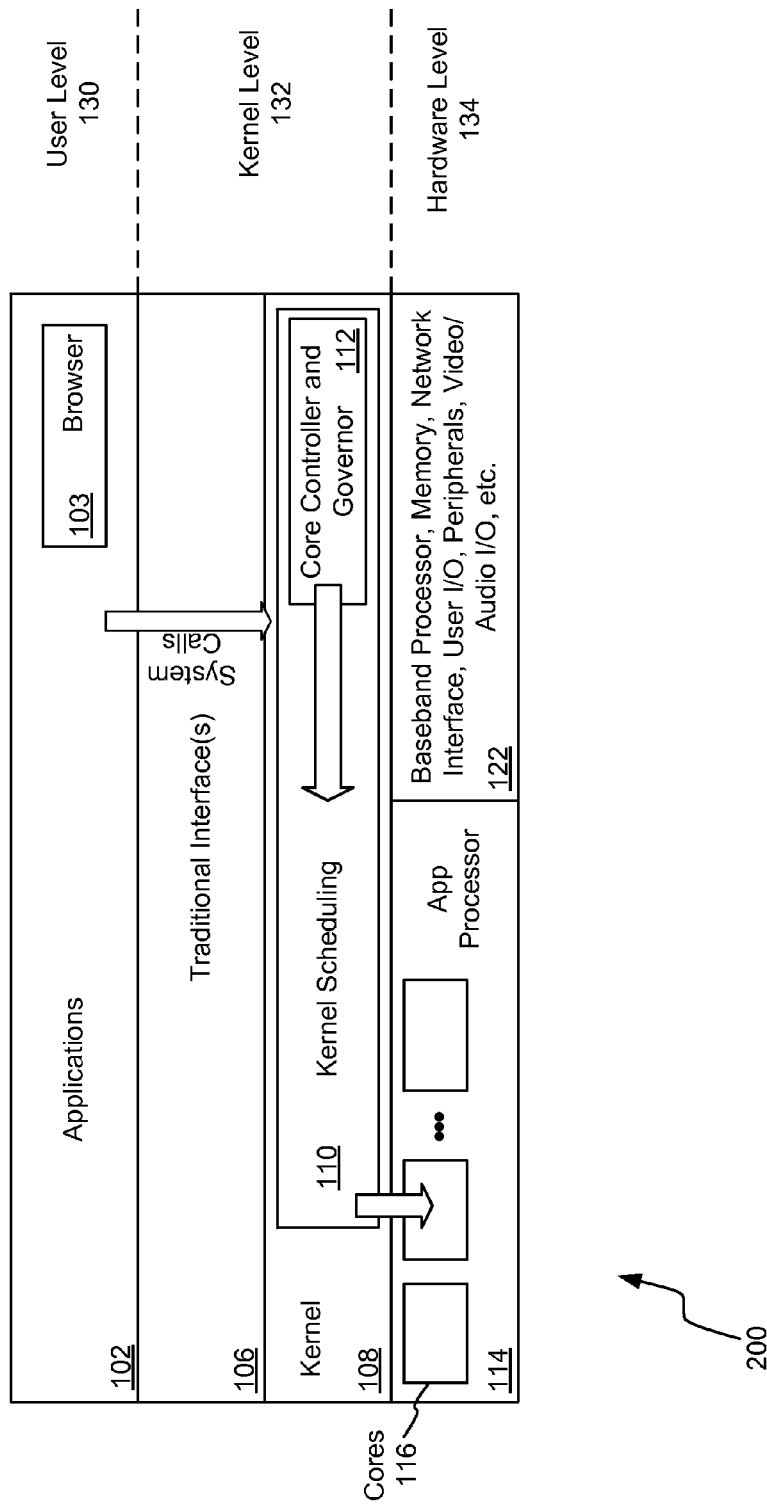
FIG. 1 illustrates a block diagram of traditional software, hardware, and firmware components in a mobile wireless computing system.

The aforementioned challenges in the prior art (see FIG. 1) can be overcome by enabling the kernel to adjust a number of app processor cores that are online or offline and predictably adjust an operating frequency of the online cores based on a load requirement of running applications rather than basing this on the app processor load. In other words, rather than monitoring an effect of applications on the app processor, this disclosure extracts a load requirement directly from the applications that are running and can even receive predicted future load requirements from the applications. Such an approach allows faster reactions to changes in application usage of the app processor and thus lower overall power consumption than the reactive systems and methods of the art.

Figure 2:
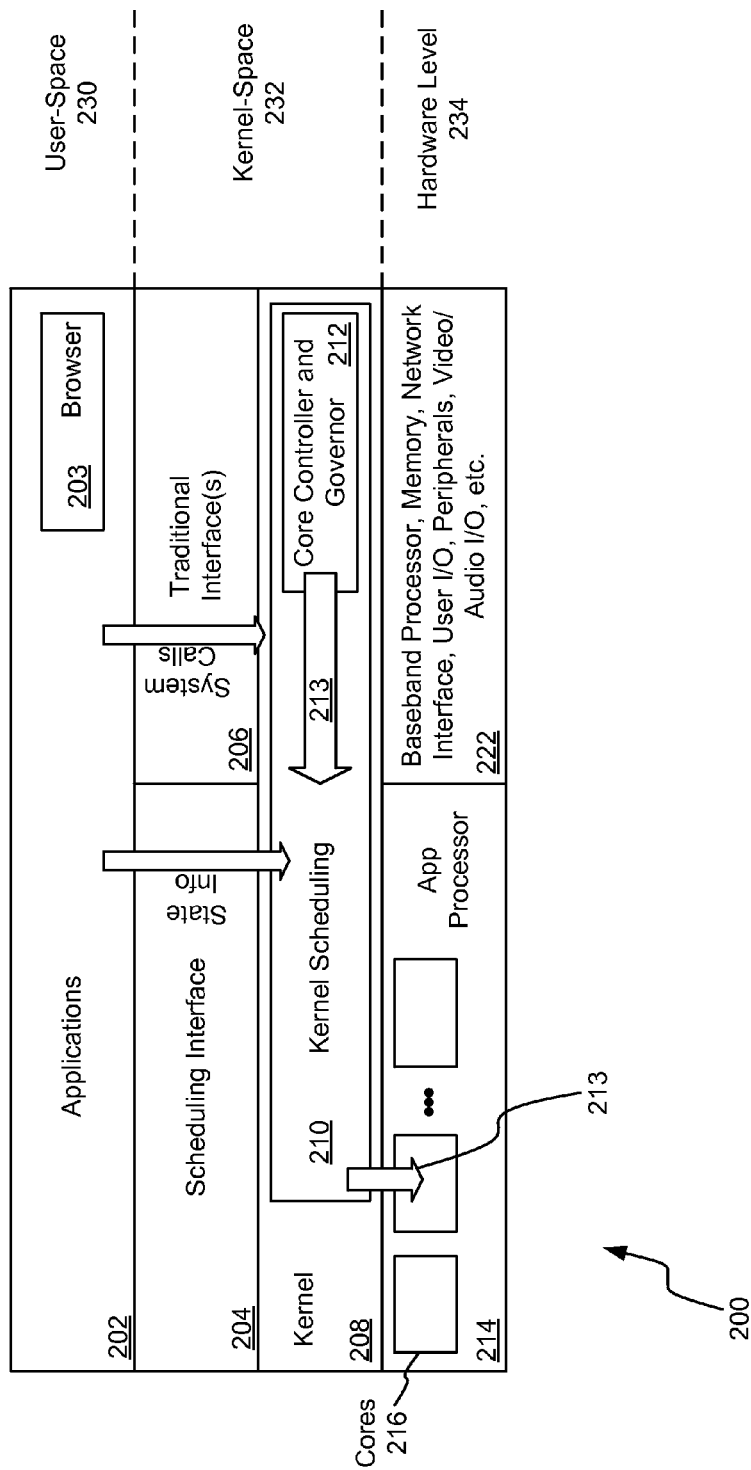
FIG. 2 illustrates one embodiment of abstraction layers of a system configured to conserve user equipment power via use of application state information.

This is achieved, in one instance, by the system 200 illustrated in FIG. 2. The system 200 enables the above-described functionality by monitoring a state of one or more applications 202 running on a UE, where different states of an application 202 are known to correspond to an app processor 214 load requirement (a load that an application places on the app processor 214). Traditionally, such a state was not passed to a kernel 208. However, by adding a new interface (or API), called a scheduling interface 204, a state of an application 202 can be passed to the kernel 208, such that the kernel 208 can adjust the number of online cores 216 and the operating frequency of the app processor 214 accordingly. As seen, this approach is proactive rather than reactive, thus providing substantial power savings over systems and methods known in the art. An API can refer to a complete interface, a single new function, or even a set of APIs provided by a single developer.

In one embodiment, one of the applications 202, (e.g., a browser 203) can make a system call to the kernel 208 via the traditional interface(s) 206. A call can mean invoking a function or loading it into the stack and then computing instructions associated with the function. As this occurs, state information regarding the application can be passed to the kernel 208 via the scheduling interface 204. The core controller and governor 212 can use the state information, and optionally load information regarding the app processor 214, to generate instructions 213 for the app processor 214 (e.g., increase/decrease frequency and/or increase/decrease a number of idle cores 216). The instructions can be passed to the kernel scheduling module 210, which then controls aspects of the app processor 214. In one case, this means reducing power consumption of the app processor 214 while maintaining a user experience. Maintaining the user experience is achieved by keeping the app processor 214 running at a level just sufficient to meet the calls of the one or more applications 202 and to do so such that the user does not experience any slowing of the user equipment, degradation in graphics or audio, or any other degradation in performance that is humanly noticeable.

Applications 202 (e.g., browser 203) are illustrated at the highest level of abstraction and hardware, such as the app processor 214, is illustrated at the lowest level. The kernel 208 along with interfaces 204 and 206 enable communication between the applications 202 and the app processor 214. A scheduling interface 204 monitors a state of the applications 202, where each state corresponds to a known app processor 214 load requirement. The scheduling interface 204 passes the state information for one or more applications 202, or a known or predicted load requirement, to the kernel 208. The core controller and governor 212 then uses this state information to determine an operating frequency for the app processor 214. In particular, the operating frequency can be selected as a minimum operating frequency configured to meet the known or predicted load requirement of the applications 202 without diminishing a user experience level. In other words, the operating frequency of online cores 216 can be based on state information provided by one or more applications 202. The kernel scheduling module 210 then instructs the app processor 214 to operate its online cores 216 at a decreased operating frequency (e.g., a minimum operating frequency) or to decrease a number of cores 216 that are operating (online).

The one or more applications 202 may be realized by a variety of applications that operate via or run on the app processor 214. For example, the one or more applications 202 may include a web browser 203 and associated plug-ins, entertainment applications (e.g., video games, video players), productivity applications (e.g., word processing, spreadsheet, publishing applications, video editing, photo editing applications), core applications (e.g., phone, contacts), and augmented reality applications.

Each application of the one or more applications 202 can have states. Each state corresponds to or describes a load requirement that can be expected to be applied on the app processor 214 by the running of application processes or by an application call. The one or more applications 202 can pass a state for each application to the kernel 208, which uses the state to control the app processor 214 operating frequency and a number of online cores 216, thus enabling control of these aspects without having to monitor a load on the app processor 214. Each application can have one or more states, for instance five states.

This is also advantageous in a predictive sense since it may be known that an application 202 will enter a given state sometime in the future or that a current state will require a certain load on the app processor 214 at a future time. State information can thus describe a predicted load that an application expects to place on the app processor 214 as a result of an application call that has yet to occur. As a result, the core controller and governor 212 can modify the number of online cores 216 and/or the operating frequency of the online cores 216 at the same time or slightly before the load on the app processor 214 changes. In this way, operation of the app processor 214 can be more quickly adjusted to account for changes in load requirements of the one or more applications 202 than has been achieved in the art. For instance, where an application knows that a call will be made in approximately two seconds that will required half the resources of the app processor 214 currently being used, then this state can be passed to the kernel scheduling module 210, where the core controller and governor 212 can then instruct the app processor 214 to decrease a number of cores 216 that are operating or a frequency of the online cores 216 at or slightly before the expected decrease in required processor 214 resources.

Exemplary states or state information include a browser in a scrolling state or a browser performing a DNS resolution of a root domain. A browser in a scrolling state, where the user is scrolling a web page after the page has loaded, may put varying loads on the app processor 214 depending on the resource requirements of the page being scrolled. In comparison, during a DNS resolution of a root domain, the app processor 214 has little to no load and is thus ideally suited for operating at a lower frequency and/or with more idle cores. In one embodiment, the browser 203 can be downloading content such that no processing is required. During such a period, the app processor 214, or portions thereof, can be idled, or the operating frequency can be decreased since little to no load will be placed on the app processor 214. In particular, the browser 203 can be downloading root HTML or JAVASCRIPT, to name two examples. In another example, the browser 203 could be waiting for a response from a DNS server after making a DNS request; here again there is little need for the app processor to be running at maximum, so state information can be provided to the kernel 208 indicating that the browser 203 does not need as much processing resources.

In an embodiment, the relationship between a state and a load requirement can be determined via empirical data gathered via testing. For instance, one of the applications 202 can be operated and the load on the app processor 214 can be monitored for various calls that the application makes. These loads can be correlated with the application calls thus generating states that can be stored for later use. When the kernel 208 receives state information from one or more applications 202, it can determine what load is likely or expected to be placed on the app processor 214 based on the empirically-derived state information, and can adjust the app processor 214 to minimize power consumption while still maintaining an acceptable user experience (e.g., the same user experience as before the app processor 214 adjustment).

The one or more applications 202 can automatically notify the kernel 208, via the scheduling interface 204, when a state change occurs or is going to occur. Alternatively, the scheduling interface 204 can monitor or periodically sample application 202 states and report the same to the kernel 208. In an alternative embodiment, the scheduling interface 204 can report a load requirement to the kernel 208 in addition to or rather than reporting an application 202 state.

While a traditional interface(s) 206 enables the applications 202 to make system calls to the kernel 208, they do not indicate an application's 202 state to the kernel 208. Thus, the kernel 208 typically does not use or react to a state of the one or more applications 202. However, here, the scheduling interface 204, enables state information of an application of the one or more applications 202 to be passed to or made available to the kernel 208, and in particular to the core controller and governor 212. The core controller and governor 212, via the kernel scheduling module 210, can then modify a number of online cores 216 or a frequency of the online cores 216 based on the state(s) of the one or more applications 202.

The one or more applications 202 can be part of a user-space 230, while the scheduling interface 204, traditional interfaces 206, kernel 208, and core controller and governor 212 can be part of a kernel-space 232. The kernel 208 can be monolithic or a microkernel, although other alternatives are also possible.

This solution was not previously possible because stack developers optimizing the kernel 208 typically see the applications 202 and other higher level functions in the stack as a black box. They are often unaware that applications 202 even have state information. It thus would not occur to one of skill in the art to look to the application 202 states for information that could be used to modify scheduling of the kernel 208. However, the inventors, who are applications 202 specialists, realized that state information about the applications 202 existed and could be used to advantageously schedule the kernel 208. They thus sought a way to pass this state information to the kernel 208 to improve scheduling.

It should be understood that the kernel scheduling module 210 and the core controller and governor 212 can either reduce the operating frequency of cores 216 that are online, reduce a number of cores 216 that are online, or both. The kernel scheduling module 210 and the core controller and governor 212 can also increase the operating frequency of online cores 216, increase the number of cores 216 that are online, or both. The kernel scheduling module 210 and the core controller and governor 212 can also increase the operating frequency while decreasing the number of online cores 216, or decrease the operating frequency and increase the number of online cores 216.

In some embodiments, the cores 216 may not all be equal. For instance, one core may have a maximum operating frequency that is lower than that of the other cores, yet uses less power. To save power, this low power core may be online given low load requirements and idled in favor of more powerful cores during high loading periods. In another embodiment, some cores may have their operating frequencies lowered to a greater extent than others. When this happens, the frequencies should be lowered so that they cumulatively produce an effect that meets the predicted load.

When scheduling the app processor 214, the kernel scheduling module 210 and the core controller and governor 212 may take into account variable rates of change that the operating frequency of online cores 216 can undergo (e.g., increasing frequency may take longer than decreasing it). As such, the kernel scheduling module 210 and the core controller and governor 212 may provide a little more lead time when instructing the app processor 214 to increase online core 216 frequencies than when instructing it to decrease those frequencies.

As one of ordinary skill in the art will appreciate, the user-space 230 and kernel-space 232 components depicted in FIG. 2 may be realized by computer code stored in a non-transitory tangible computer readable medium such as non-volatile memory 222, and can be executed by app processor 214. Numerous variations on the embodiments herein disclosed are also possible. For instance, the governor of the core controller and governor 212 can be selected from the following non-exclusive list: interactive, smoothass, conservative, ondemand, userspace, powersave, performance, smartass, and always max While the systems and methods herein disclosed have been described in terms of modifying the number of online cores and the operating frequency of the online cores, other power conservation techniques can also be applied to the application state-based decisions of this disclosure. For instance, in addition to, or instead of, modifying the number of online cores or the operating frequency of online cores, dynamic voltage scaling and various idle states can also be used. In particular, in addition to decreasing the operating frequency when the application state indicates a low load requirement, a voltage of the app processor (and/or other components) can be decreased (undervolting) to save power. Undervolting not only saves power via use of lower voltage, but it also saves power by lowering cooling requirements. In other instances, idle states that involve partial shutdown of one or more cores 216 can be used (e.g., C0, C1, C1E, C3, C6, etc.). In some cases a combination of these techniques can be used—for instance P states, where both operating frequency and core 216 voltage are modified.

Figure 3:
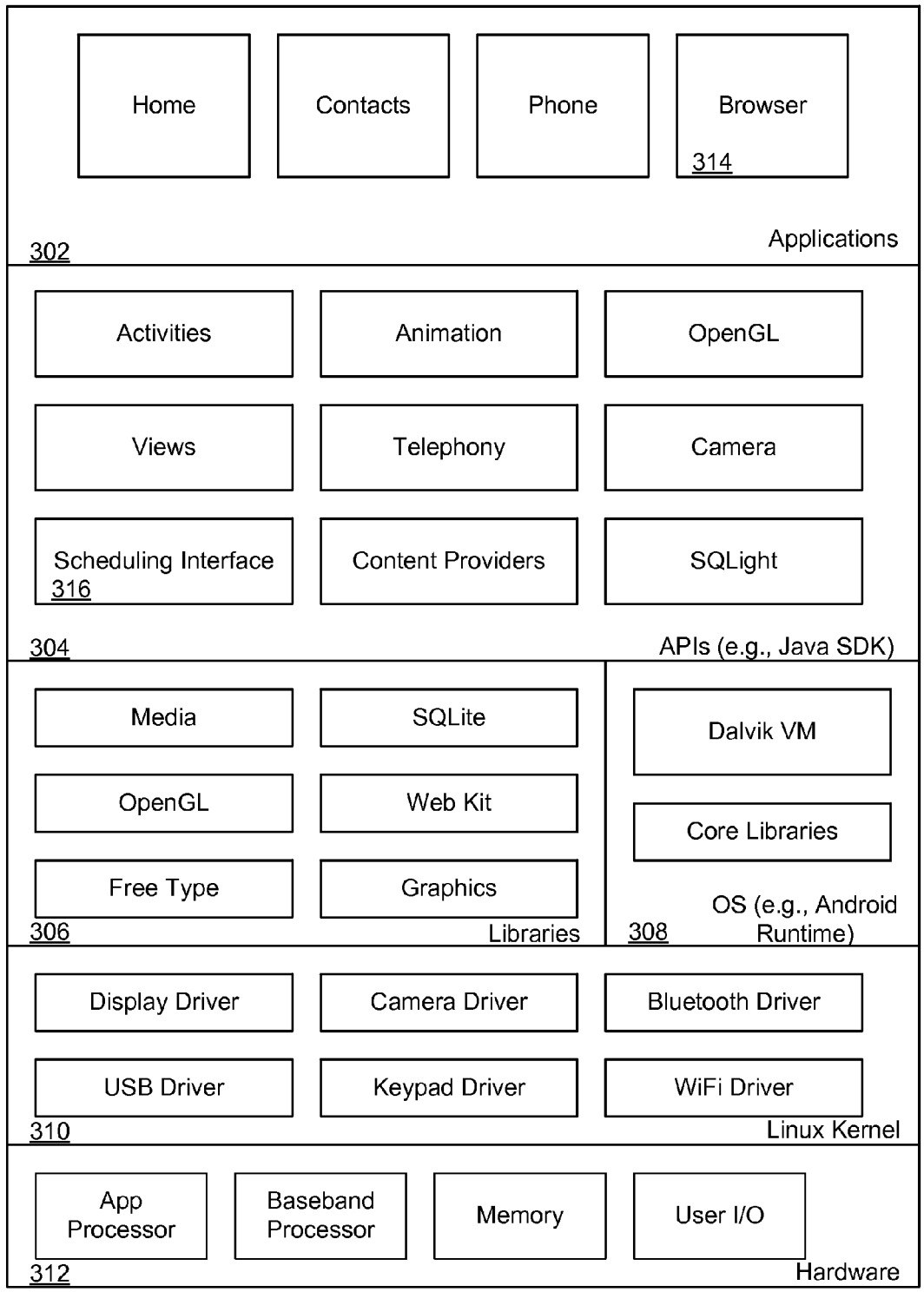
FIG. 3 illustrates another embodiment of abstraction layers compatible with ANDROID OS.

FIG. 3 illustrates one embodiment of the present disclosure as applied to a stack abstraction compatible with ANDROID OS. At the highest abstraction layer, the stack include applications 302, such as applications for home, contacts, phone, and browser 314. The next level of abstraction includes application programming interfaces 304 (APIs) such as the Java SDK. They may also include an API called a scheduling interface 316. The scheduling interface 316 can be configured to pass state information about one or more of the applications 302 to the kernel. The next level down in the stack includes the OS 308 and libraries 306. The OS can be an ANDROID RUNTIME OS including a Dalvik virtual machine (VM) and core libraries of the OS 308. Below the layer including the libraries 306 and the OS 308, is a LINUX kernel layer 310 that acts as an intermediary between the OS 308 and a hardware layer 312.

APIs in the API layer 304 can include activities, views, animation, telephony, content providers, OpenGL, camera, and SQLite, to name a few. The libraries 306 can include ones for media, OpenGL, Free Type, SQLite, Web Kit, and Graphics, to name a few. The libraries can be based off the core library of the OS or can replace portions of the core libraries.

The LINUX kernel layer 310 can include various aspects such as display drivers, USB drivers, camera drivers, keypad drivers, Bluetooth drivers, WIFI drivers, flash memory drivers, audio drivers, binder (IPC) drivers, and power management drivers, to name a few. The kernel interfaces higher layers of the stack with the hardware layer 312, and hardware such as the app processor, baseband processor, memory, and user input/output, to name a few. The LINUX kernel layer 310 also receives state information about one or more applications in the applications layer 302 and controls characteristics of the app processor 312 based on the state information. Such characteristics can include, but are not limited to, a number of online processor cores, an operating frequency of online processor cores, and an operating voltage of online processor cores.

Figure 4:
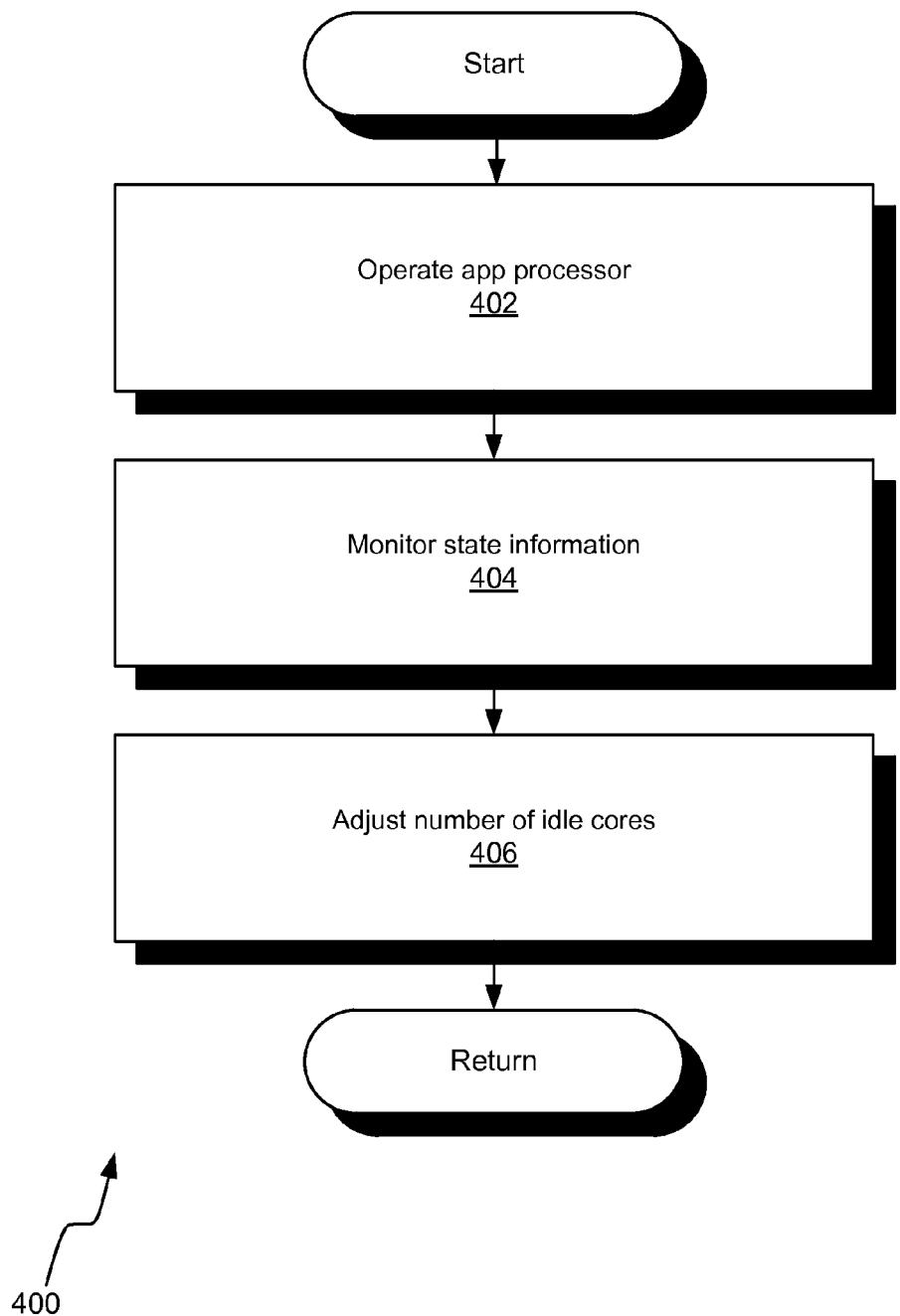
FIG. 4 illustrates a method according to one embodiment of this disclosure.

FIG. 4 illustrates a method according to one embodiment of this disclosure. The method 400 can include operate an application processor of a user equipment in operate app processor operation 402. The application processor can comprise one or more cores each operating at a different or the same operating frequencies. The method 400 can further include monitoring state information of one or more applications running on the application processor in monitor state information operation 404. The state information can represent a predicted load that the one or more applications are expected to place on the application processor. The method 400 can also include adjusting a number of the one or more cores that are operating in an idle state in order to meet the predicted load indicated by the state information in an adjust number of idle cores operation 406.

Figure 5:
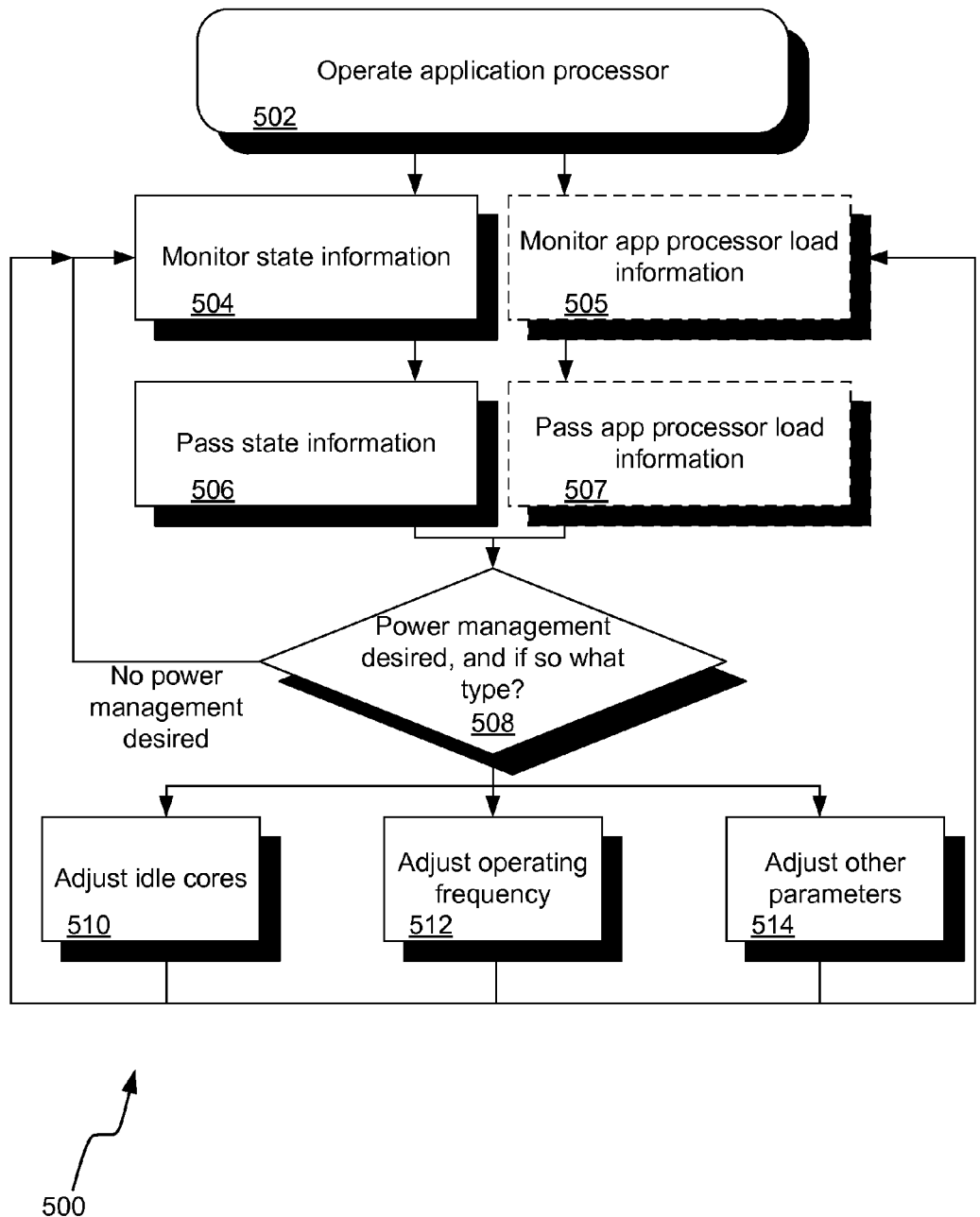
FIG. 5 illustrates a method according to another embodiment of this disclosure.

FIG. 5 illustrates a method according to another embodiment of this disclosure. The method 500 begins with an operating an application processor operation 502. The application processor can include multiple cores, where each core can operate at the same or different operating frequencies. Each core is also configured to operate in an online or offline (idle) mode. The method 500 can monitor state information of one or more applications running on the application processor in a monitor state information operation 504. A scheduling interface in the kernel space of a software stack associated with the application processor can pass the state information to a kernel of the stack in a pass state information operation 506. The kernel can include a kernel scheduling module inclusive of a core controller and governor, which uses the state information to manage power consumption of the app processor. This control can include adjusting an operating frequency of one or more of the cores in the application processor and/or adjusting a number of the cores that are in the idle mode. In particular, the kernel scheduling module and the core controller and governor can determine whether to increase/decrease a number of idle cores (adjust idle cores operation 510), whether to increase or decrease an operating frequency of one or more online cores (adjust operating frequency operation 512), and/or whether to adjust other power consumption parameters such as an operating voltage of the cores (adjust other power consumption parameters operation 514). Determining what and how these three power management techniques are carried out is determined by a power management decision 508.

If there is no change in state information, or no substantial change in state information, or if the state information does not indicate that a change in idle cores, operating frequency, or other power management parameters is desired, then the method 500 can return to the monitor state information operation 502. If a change has occurred, then the method 500 can also return to the monitor state information operation 502.

Optionally, the method 500 can also monitor app processor load information in a second monitor operation 505. This information can then be passed to the kernel of the stack in a second pass app processor load information operation 507. The power management decision 508 and the adjustment operations 510, 512, 514 can then be based on a combination of state information from the applications and app processor load information from the app processor. It should be understood that the monitoring and passing operations 504, 505, 506, 507 need not operate simultaneously or at the same rates or have any other equivalency that one might read from the illustration. Rather, a variety of timing schemes is envisioned. For instance, the adjustment operations 510, 512, 514 may be based on recent state information combined in a weighted fashion with an ongoing stream of app processor load information.

Figure 6:
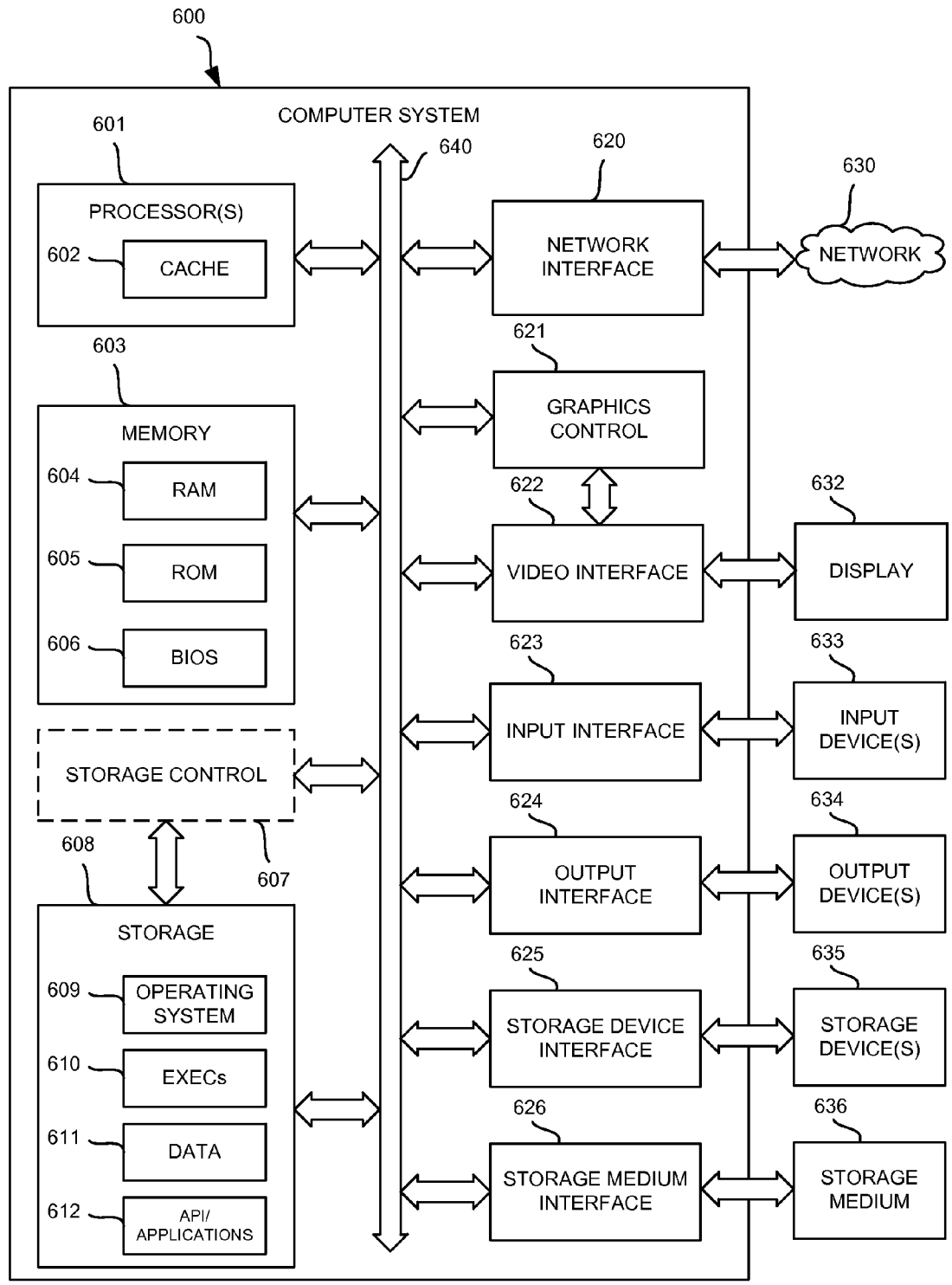
FIG. 6 shows a diagrammatic representation of one embodiment of a machine in the exemplary form of a computer system within which a set of instructions can execute for causing a device to perform or execute any one or more of the aspects and/or methodologies of the present disclosure.

The systems and methods described herein can be implemented in a machine such as a computer system in addition to the specific physical devices described herein. FIG. 6 shows a diagrammatic representation of one embodiment of a machine in the exemplary form of a computer system 600 within which a set of instructions can execute for causing a device to perform or execute any one or more of the aspects and/or methodologies of the present disclosure. The components in FIG. 6 are examples only and do not limit the scope of use or functionality of any hardware, software, embedded logic component, or a combination of two or more such components implementing particular embodiments.

Computer system 600 may include a processor 601, a memory 603, and a storage 608 that communicate with each other, and with other components, via a bus 640. The bus 640 may also link a display 632, one or more input devices 633 (which may, for example, include a keypad, a keyboard, a mouse, a stylus, etc.), one or more output devices 634, one or more storage devices 635, and various tangible storage media 636. All of these elements may interface directly or via one or more interfaces or adaptors to the bus 640. For instance, the various tangible storage media 636 can interface with the bus 640 via storage medium interface 626. Computer system 600 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 601 (or central processing unit(s) (CPU(s))) optionally contains a cache memory unit 602 for temporary local storage of instructions, data, or computer addresses. Processor(s) 601 are configured to assist in execution of computer readable instructions. Computer system 600 may provide functionality as a result of the processor(s) 601 executing software embodied in one or more tangible computer-readable storage media, such as memory 603, storage 608, storage devices 635, and/or storage medium 636. The computer-readable media may store software that implements particular embodiments, and processor(s) 601 may execute the software. Memory 603 may read the software from one or more other computer-readable media (such as mass storage device(s) 635, 636) or from one or more other sources through a suitable interface, such as network interface 620. The software may cause processor(s) 601 to carry out one or more processes or one or more steps of one or more processes described or illustrated herein. Carrying out such processes or steps may include defining data structures stored in memory 603 and modifying the data structures as directed by the software.

The memory 603 may include various components (e.g., machine readable media) including, but not limited to, a random access memory component (e.g., RAM 604) (e.g., a static RAM "SRAM", a dynamic RAM "DRAM, etc.), a read-only component (e.g., ROM 605), and any combinations thereof. ROM 605 may act to communicate data and instructions unidirectionally to processor(s) 601, and RAM 604 may act to communicate data and instructions bidirectionally with processor(s) 601. ROM 605 and RAM 604 may include any suitable tangible computer-readable media described below. In one example, a basic input/output system 606 (BIOS), including basic routines that help to transfer information between elements within computer system 600, such as during start-up, may be stored in the memory 603.

Fixed storage 608 is connected bidirectionally to processor(s) 601, optionally through storage control unit 607. Fixed storage 608 provides additional data storage capacity and may also include any suitable tangible computer-readable media described herein. Storage 608 may be used to store operating system 609, EXECs 610 (executables), data 611, APV applications 612 (application programs), and the like. Often, although not always, storage 608 is a secondary storage medium (such as a hard disk) that is slower than primary storage (e.g., memory 603). Storage 608 can also include an optical disk drive, a solid-state memory device (e.g., flash-based systems), or a combination of any of the above. Information in storage 608 may, in appropriate cases, be incorporated as virtual memory in memory 603.

In one example, storage device(s) 635 may be removably interfaced with computer system 600 (e.g., via an external port connector (not shown)) via a storage device interface 625. Particularly, storage device(s) 635 and an associated machine-readable medium may provide nonvolatile and/or volatile storage of machine-readable instructions, data structures, program modules, and/or other data for the computer system 600. In one example, software may reside, completely or partially, within a machine-readable medium on storage device(s) 635. In another example, software may reside, completely or partially, within processor(s) 601.

Bus 640 connects a wide variety of subsystems. Herein, reference to a bus may encompass one or more digital signal lines serving a common function, where appropriate. Bus 640 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 600 may also include an input device 633. In one example, a user of computer system 600 may enter commands and/or other information into computer system 600 via input device(s) 633. Examples of an input device(s) 633 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 633 may be interfaced to bus 640 via any of a variety of input interfaces 623 (e.g., input interface 623) including, but not limited to, serial, parallel, game port, USB, FIREWIRE, THUNDERBOLT, or any combination of the above.

In particular embodiments, when computer system 600 is connected to network 630, computer system 600 may communicate with other devices, specifically mobile devices and enterprise systems, connected to network 630. Communications to and from computer system 600 may be sent through network interface 620. For example, network interface 620 may receive incoming communications (such as requests or responses from other devices) in the form of one or more packets (such as Internet Protocol (IP) packets) from network 630, and computer system 600 may store the incoming communications in memory 603 for processing. Computer system 600 may similarly store outgoing communications (such as requests or responses to other devices) in the form of one or more packets in memory 603 and communicated to network 630 from network interface 620. Processor(s) 601 may access these communication packets stored in memory 603 for processing.

Examples of the network interface 620 include, but are not limited to, a network interface card, a modem, and any combination thereof. Examples of a network 630 or network segment 630 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 630, may employ a wired and/or a wireless mode of communication. In general, any network topology may be used.

Information and data can be displayed through a display 632. Examples of a display 632 include, but are not limited to, a liquid crystal display (LCD), an organic liquid crystal display (OLED), a cathode ray tube (CRT), a plasma display, and any combinations thereof. The display 632 can interface to the processor(s) 601, memory 603, and fixed storage 608, as well as other devices, such as input device(s) 633, via the bus 640. The display 632 is linked to the bus 640 via a video interface 622, and transport of data between the display 632 and the bus 640 can be controlled via the graphics control 621.

In addition to a display 632, computer system 600 may include one or more other peripheral output devices 634 including, but not limited to, an audio speaker, a printer, and any combinations thereof. Such peripheral output devices may be connected to the bus 640 via an output interface 624. Examples of an output interface 624 include, but are not limited to, a serial port, a parallel connection, a USB port, a FIREWIRE port, a THUNDERBOLT port, and any combinations thereof.

In addition or as an alternative, computer system 600 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for reducing power consumption on a mobile communication device comprising:
    an application processor having a plurality of cores, each core operating at one or more operating frequencies;
    one or more applications performing user-initiated and automated tasks and running on at least one of the plurality of cores, and further providing state information, each instance of the state information indicating a state of one of the one or more applications, each state of an application corresponding to a predicted load that the one of the one or more applications is expected to place on the application processor;

a scheduling interface running on the application processor, and configured to facilitate communication of the state information from the one or more applications; and a kernel of a kernel layer running on the application processor, the kernel configured to (1) receive the state information from the one or more applications via the scheduling interface, and (2) decrease the one or more operating frequencies of the plurality of cores to one or more new operating frequencies such that a cumulative performance of the application processor is sufficient to meet the predicted load, thereby reducing power consumed by the application.

2. The system of claim 1, wherein the kernel is configured to decrease power consumption of the application processor.

3. The system of claim 2, wherein the kernel is configured to instruct one or more of the cores to operate in an idle mode.

4. The system of claim 3, wherein the kernel is configured to maintain a user experience level despite the one or more cores operating in an idle mode.

5. The system of claim 2, wherein the kernel is configured to instruct one or more of the cores to operate at a lower voltage.

6. The system of claim 2, wherein the kernel is further configured to maintain a user experience level despite the decrease in the one or more operating frequencies.

7. The system of claim 1, wherein the scheduling interface is an application programming interface.

8. The system of claim 1, wherein the state of the one of the one or more applications is a download state of a browser.

9. The system of claim 8, wherein the download state of the browser is idle.

10. The system of claim 1, wherein the user experience level is maintained equal to a user experience level before the decrease of the one or more operating frequencies.

11. The system of claim 1, wherein the one of the one or more applications exists in one of the five different states at any given moment.

12. The system of claim 1, wherein the state information is derived from empirical test data.

13. A method for reducing power consumption on a mobile communication device comprising:

operating an application processor of a user equipment, where the application processor comprises one or more cores, and each of the one or more cores operates at one or more operating frequencies;

monitoring state information of one or more applications performing tasks and running on at least one or the plurality of cores, each instance of the state information indicating a state of one of the one or more applications, each state of an application corresponding to a predicted load that the one of the one or more applications is expected to place on the application processor; and adjusting a number of the one or more cores that are operating in an idle state in order to meet the predicted load indicated by the state information.

14. The method of claim 13, further comprising changing the operating frequency of at least one of the one or more cores in order to meet the predicted load.

15. The method of claim 13, further comprising passing the state information from the one or more applications to a kernel of a kernel layer running on the application processor.

16. The method of claim 15, further comprising passing the state information from the one or more applications to a kernel scheduling module running on the application processor.

17. A non-transitory, tangible computer readable storage medium, encoded with processor readable instructions to perform a method for conserving power in a user equipment by using knowledge of application state information to manage power usage of an application processor, the method comprising:

operating an application processor of a user equipment, where the application processor comprises one or more cores, and each of the one or more cores operates at one or more operating frequencies;

monitoring state information of one or more applications performing tasks and running on at least one or the plurality of cores, each instance of the state information indicating a state of one of the one or more applications, each state of an application corresponding to a predicted load that the one of the one or more applications is expected to place on the application processor; and adjusting a number of the one or more cores that are operating in an idle state in order to meet the predicted load indicated by the state information.

18. The non-transitory, tangible computer readable storage medium of claim 17, further comprising changing the operating frequency of at least one of the one or more cores in order to meet the predicted load.

19. The non-transitory, tangible computer readable storage medium of claim 17, wherein the application is a web browser, the predicted load being known despite the web browser visiting a webpage for the first time.

* * * * *